(12) United States Patent
Thapliya et al.

(10) Patent No.: US 9,031,083 B2
(45) Date of Patent: May 12, 2015

(54) COMMUNICATION MANAGEMENT SYSTEM, COMMUNICATION MANAGEMENT METHOD, AND NON-TRANSITORY COMPUTER READABLE MEDIUM

(71) Applicant: Fuji Xerox Co., Ltd., Minato-ku, Tokyo (JP)

(72) Inventors: Roshan Thapliya, Kanagawa (JP); Tohru Fuse, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 263 days.

(21) Appl. No.: 13/661,320

(22) Filed: Oct. 26, 2012

(65) Prior Publication Data

US 2013/0294234 A1    Nov. 7, 2013

(30) Foreign Application Priority Data

May 7, 2012   (JP) .................................. 2012-106231

(51) Int. Cl.
*H04B 7/185*   (2006.01)
*H04H 20/38*   (2008.01)

(52) U.S. Cl.
CPC ............ *H04B 7/18584* (2013.01); *H04H 20/38* (2013.01)

(58) Field of Classification Search
USPC ........................................................ 370/400
See application file for complete search history.

(56) References Cited

U.S. PATENT DOCUMENTS

| 5,835,495 | A  | * | 11/1998 | Ferriere ......................... 370/465 |
| 8,811,293 | B2 | * | 8/2014 | Octaviano et al. ............ 370/329 |
| 2007/0041401 | A1 | | 2/2007 | Kaneda et al. |
| 2009/0310700 | A1 | | 12/2009 | Liu et al. |
| 2011/0058478 | A1 | | 3/2011 | Krym et al. |

FOREIGN PATENT DOCUMENTS

| JP | 2004-147060 A | 5/2004 |
| JP | 2007-53676 A | 3/2007 |
| JP | 2008-199451 A | 8/2008 |

OTHER PUBLICATIONS

Australian Office Action issued Jan. 29, 2014 in corresponding Australian Patent Application No. 2012250285.

* cited by examiner

*Primary Examiner* — Chandrahas Patel
(74) *Attorney, Agent, or Firm* — Sughrue Mion, PLLC

(57) ABSTRACT

A communication management system includes a measuring unit, an assigning unit, and a distribution controller. The measuring unit measures, for each of clients, a traffic pattern representing a pattern of temporal changes in an amount of communication traffic regarding the client. The assigning unit assigns, to each of plural communication channels, one or more clients that use the communication channel, on the basis of the traffic patterns of the clients measured by the measuring unit. The distribution controller performs control of selecting, as a communication channel with which distribution data is to be distributed to one or more of the clients, at least one of the plural communication channels to which the assigning unit has assigned the clients.

9 Claims, 14 Drawing Sheets

FIG. 4

| CLIENT ID | TRAFFIC PATTERN | FEATURE VECTOR |
|---|---|---|
| A | <TRAFFIC PATTERN A> | (TmaxA, BmaxA) OR (rA, θA) |
| B | <TRAFFIC PATTERN B> | (TmaxB, BmaxB) OR (rB, θB) |
| ⋮ | ⋮ | ⋮ |

FIG. 5

| CHANNEL ID | CHANNEL TYPE | CHANNEL BANDWIDTH |
|---|---|---|
| Ch1 | BANDWIDTH GUARANTEE | X Gbps |
| Ch2 | BEST EFFORT | <PATTERN OF TEMPORAL CHANGES OF EFFECTIVE BANDWIDTH> |
| ⋮ | ⋮ | ⋮ |

FIG. 10

| CLUSTER ID | DEFINITION OF RANGE OF CLUSTER |
|---|---|
| C1 | CENTER (r1, θ1), RADIUS R1 |
| C2 | CENTER (r2, θ2), RADIUS R2 |
| ⋮ | ⋮ |

FIG. 11

| CHANNEL ID | LIST OF ASSIGNABLE COMBINATIONS OF CLUSTERS |
|---|---|
| Ch1 | C1 + C2, C2 + C3, C3 + C3, ... |
| Ch2 | C1 + C1, C1 + C2 + C3, C1 + C3 + C3, ... |
| ⋮ | ⋮ |

FIG. 12

| CLIENT ID | ASSIGNED CHANNEL |
|---|---|
| A | Ch2 |
| B | Ch1 |
| ⋮ | ⋮ |

FIG. 13

| CHANNEL ID | TOTAL PATTERN OF ASSIGNED CLIENTS |
|---|---|
| Ch1 | <TOTAL PATTERN Ch1> |
| Ch2 | <TOTAL PATTERN Ch2> |
| ⋮ | ⋮ |

FIG. 15

| INSTRUCTION ID | CLIENT ID | USER ID | DESTINATION | DISTRIBUTION DATA ID | SPECIFIED TIME | DISTRIBUTION GUARANTEE TIME |
|---|---|---|---|---|---|---|
| 001101 | A | A001 | xxxxxx | aaaaaaaa | 11:00.00 | 11:01.00 |
| 001102 | B | B002 | yyyyyy | bbbbbbbb | 13:00.00 | 13:00.10 |
| ... | ... | ... | ... | ... | ... | ... |

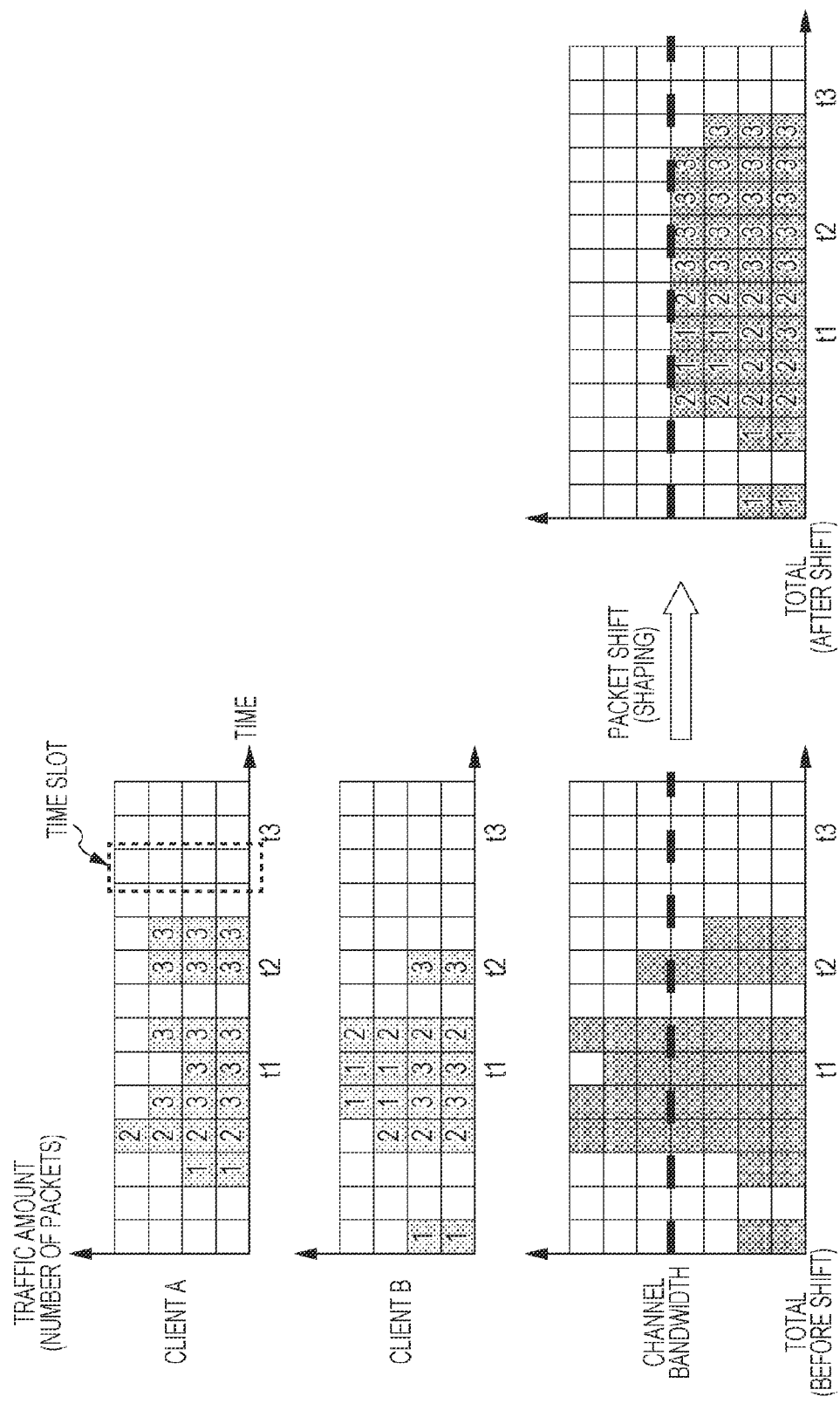

COMMUNICATION MANAGEMENT SYSTEM, COMMUNICATION MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-106231 filed May 7, 2012.

BACKGROUND

Technical Field

The present invention relates to a communication management system, a communication management method, and a non-transitory computer readable medium.

SUMMARY

According to an aspect of the invention, there is provided a communication management system including a measuring unit, an assigning unit, and a distribution controller. The measuring unit measures, for each of clients, a traffic pattern representing a pattern of temporal changes in an amount of communication traffic regarding the client. The assigning unit assigns, to each of plural communication channels, one or more clients that use the communication channel, on the basis of the traffic patterns of the clients measured by the measuring unit. The distribution controller performs control of selecting, as a communication channel with which distribution data is to be distributed to one or more of the clients, at least one of the plural communication channels to which the assigning unit has assigned the clients. The assigning unit determines one or more clients to be assigned to each of the plural communication channels so that a total pattern as a sum of the traffic patterns of the one or more clients to be assigned to the communication channel is within a communication-path capacity of the communication channel.

BRIEF DESCRIPTION OF THE DRAWINGS

An exemplary embodiment of the present invention will be described in detail based on the following figures, wherein:

FIG. 4 is a diagram illustrating an example of data content of a traffic pattern DB;

FIG. 5 is a diagram illustrating an example of data content of a channel feature DB;

FIG. 10 is a diagram illustrating an example of data content of a pattern cluster information DB;

FIG. 11 is a diagram illustrating an example of data content of an assignable combination DB;

FIG. 12 is a diagram illustrating an example of data content of a channel assignment DB;

FIG. 13 is a diagram illustrating an example of data content of a total pattern DB;

FIG. 15 is a diagram illustrating an example of data content of a distribution schedule memory;

FIG. 18 is a diagram describing traffic shaping (packet shift).

DETAILED DESCRIPTION

Figure 1:
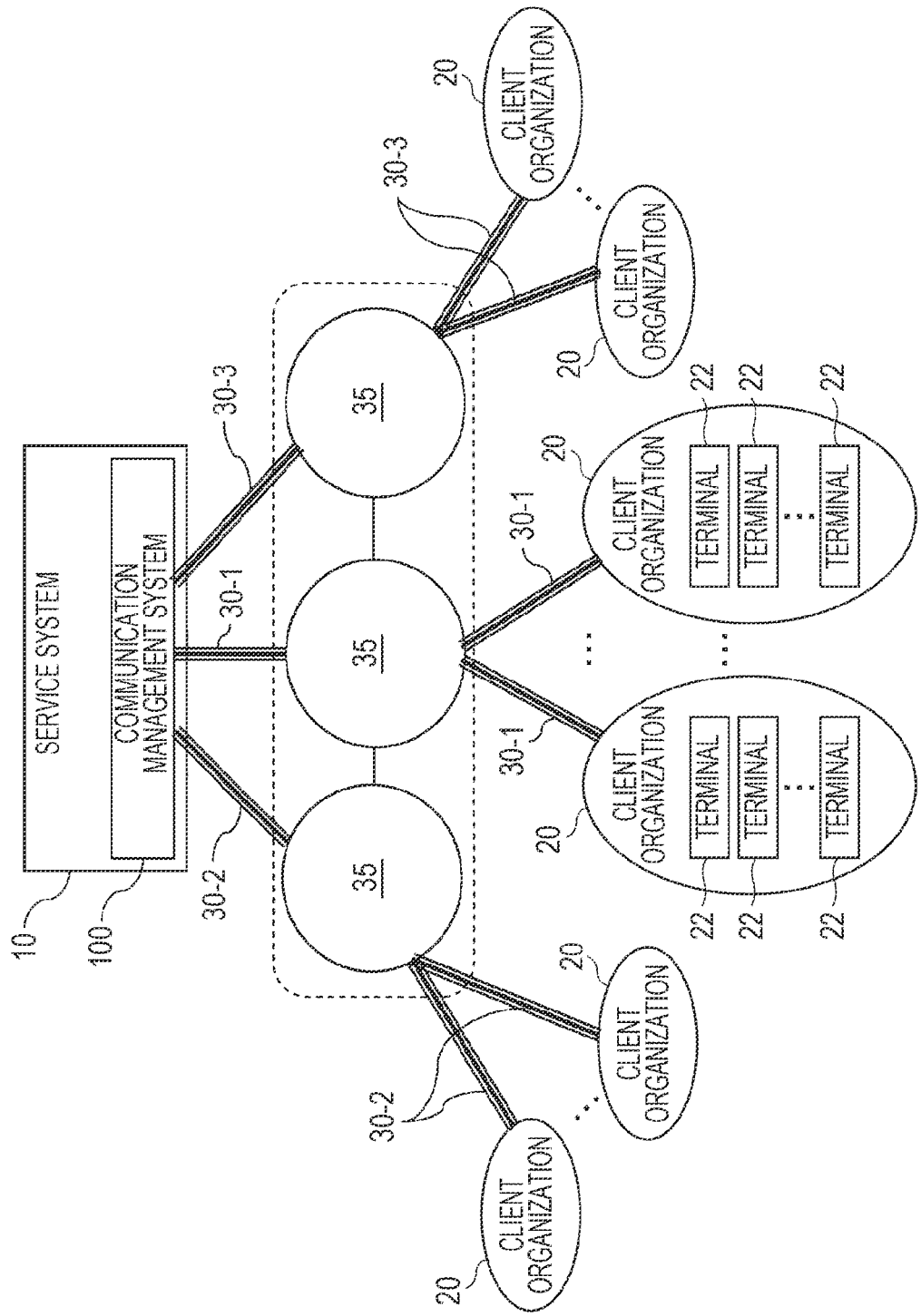
FIG. 1 is a diagram illustrating an example of a network environment to which a communication management scheme according to an exemplary embodiment is applied.

As illustrated in FIG. 1, a communication management system 100 that performs communication management according to an exemplary embodiment is applied to, for example, a service system 10 that provides information processing services to terminals 22 in plural client organizations 20. That is, the communication management system 100 according to the exemplary embodiment manages communication traffic that is used when the service system 10 provides information processing services to the terminals 22 in the client organizations 20. A communication management scheme according to the exemplary embodiment does not depend on the form of the service system 10. For example, the service system 10 may be a server as a single unit, or may be a so-called cloud-type system including plural computers. Also, the communication management scheme according to the exemplary embodiment does not depend on the types of the information processing services provided by the service system 10.

In the exemplary embodiment, an operator which operates the service system 10 rents plural communication channels 30-1 to 30-3 (hereinafter collectively referred to as communication channels 30) from a communication carrier, and provides services to the plural client organizations 20 by using the communication channels 30. Of course, the entire communication path between the service system 10 and the client organizations 20 is not necessarily constituted by the communication channels 30 rented by the operator, and a network 35 may be interposed therebetween. For example, in a case where mobile phone lines (for example, 3G network) are used as the communication channels 30 and the service system 10 is connected to the terminals 22 via the Internet, the communication channels 30 only provide coverage for the part between the service system 10 and the Internet and the part between the Internet and the terminals 22, whereas coverage for the Internet (an example of the network 35) part is provided by a backbone or the like. The number of communication carriers with which the operator makes a contract is not necessarily one. For example, the operator may rent one or more communication channels 30 from each of plural communication carriers and may use them for the service system 10.

The communication channels 30 may be any of wireless and wired. The service system 10 may use only wireless communication channels 30 or only wired communication channels 30, or may use wireless and wired communication channels 30 in combination. The communication channels 30 may be of a bandwidth guarantee type or a best effort type. The operator of the service system 10 increases or decreases the number of communication channels 30 rented from one or more communication carriers in accordance with the capacity and quality of a communication path that is necessary for the client organizations 20 with which the operator has made a contract, in view of the cost (rental fee, etc.) of the individual communication channels 30. For example, when the communication bandwidth becomes insufficient due to an increase in the number of client organizations 20, the operator rents an additional communication channel 30 from a communication carrier.

The communication channels 30 each have a communication-path capacity (bandwidth), regardless of whether they are of the bandwidth guarantee type or the best effort type. In the case of the best effort type, the communication-path capacity is merely an upper limit and is not necessarily guaranteed. The communication-path capacity may vary in the individual communication channels 30.

FIG. 1 illustrates three communication channels 30, but the number of communication channels 30 used by the service system 10 is not limited to three.

Each of the client organizations 20 is an organization including plural individuals, such as a company or group. The service system 10 assigns one or more communication channels 30 to each client organization 20, communicates with the individual terminals 22 in the client organization 20 via the assigned communication channels 30, and thereby provides services. In a case where the service system 10 uses wireless and wired communication channels 30, each client organization 20 selects any one of "use only wireless", "use only wired", and "use wireless and wired".

Each of the terminals 22 may be any type of apparatus as long as it has an information processing function and a communication function for performing communication via a network, such as a mobile information terminal (a smart phone, a tablet personal computer (PC), a mobile phone, or the like), a PC, a server, or a digital multifunction peripheral (a multifunction apparatus having functions of a copying machine, a printer, a scanner, a facsimile, etc.).

In the exemplary embodiment, one or more client organizations 20 are assigned to one communication channel 30. The service system 10 uses the plural communication channels 30 rented from a communication carrier to perform communication with the plural client organizations 20 with which the service system 10 has made a service provision contract. In an aspect of the exemplary embodiment, efforts are directed toward optimizing the assignment of the plural client organizations 20 to the plural communication channels 30 used by the service system 10 (that is, rented from the carrier). It is the communication management system 100 that performs management for this purpose.

Figure 2:
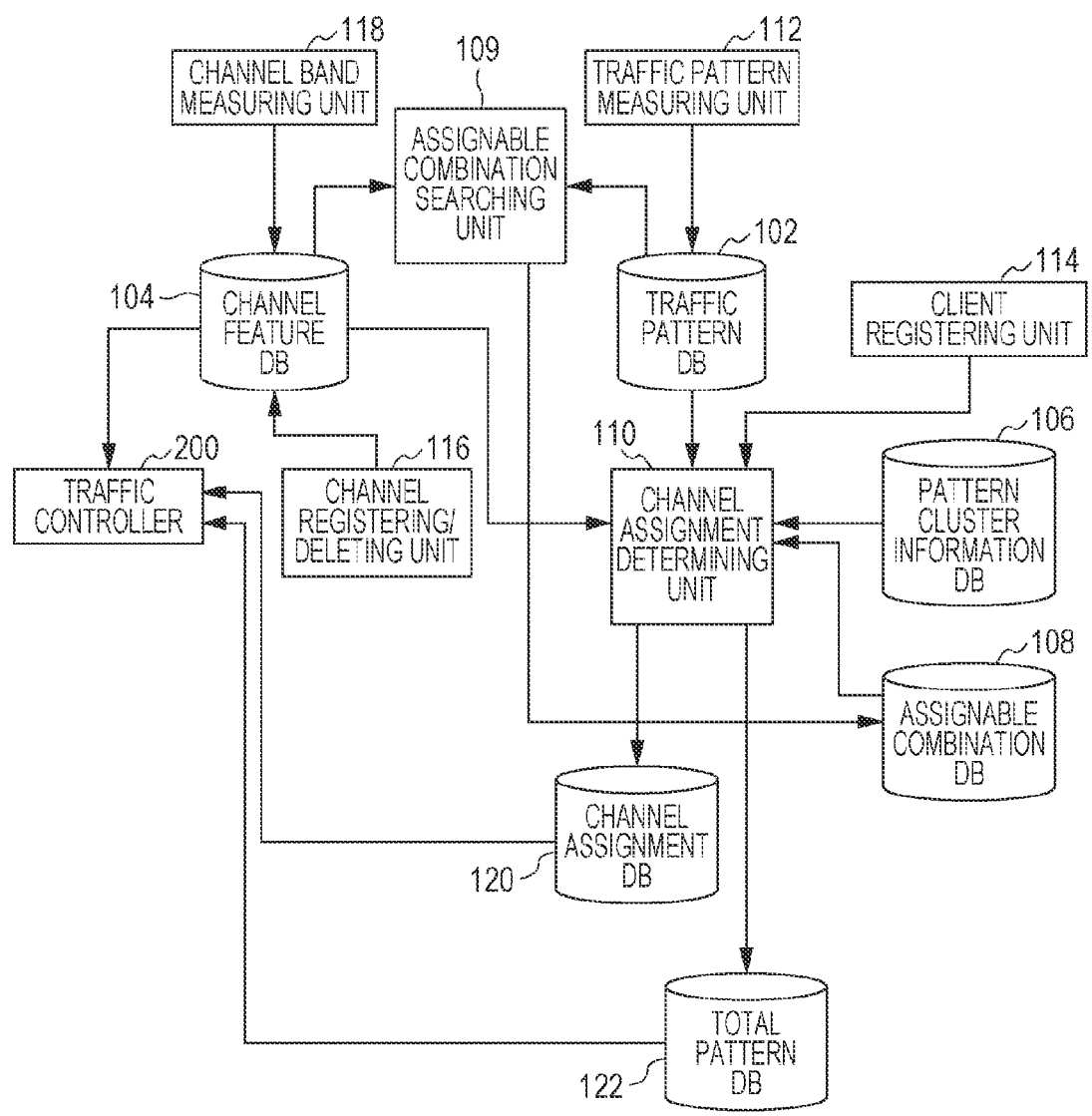
FIG. 2 is a diagram illustrating an example of a configuration of a communication management system.

FIG. 2 illustrates an example of an internal configuration of the communication management system 100.

In FIG. 2, a traffic pattern database (DB) 102 is a database that stores data about traffic patterns of the individual client organizations 20. Here, "a traffic pattern of a client organization 20" is a pattern of temporal changes in a certain period (for example, one day, one week, one month, or one year) of a traffic amount of communication performed between the client organization 20 and the service system 10.

A traffic pattern is measured by a traffic pattern measuring unit 112. Specifically, the traffic pattern measuring unit 112 measures a traffic amount of communication performed by each client organization 20 via a traffic controller 200, statistically processes the measurement result, and thereby obtains a typical pattern of temporal changes in communication traffic amount, that is, a traffic pattern, of each client organization 20. For example, a pattern of changes in a communication traffic amount over twenty-four hours of a day is measured for some continuous days regarding a certain client organization 20, and the pattern of changes over the days is averaged in each time slot, so that a traffic pattern of one day of the client organization 20 is obtained. The traffic pattern of one day may be obtained for each of a weekday and a holiday, or may be obtained for each day of the week. In many cases, a traffic pattern of an individual is not constant due to various factors. However, a traffic pattern of the client organization 20, such as a company to which a certain number of people belong, is stable to some extent because the randomness of individuals is balanced out. If the scale of the client organization 20 is large enough, a traffic pattern obtained over twenty-four hours of a day is expected to have a shape similar to that of a Gaussian distribution in which there is a peak at a certain time.

In a case where both wired and wireless communication channels 30 are used between the service system 10 and any of the client organizations 20, a traffic pattern for the wired communication channel 30 and a traffic pattern for the wireless communication channel 30 may be obtained for the client organization 20. The wired communication channel 30 is used for PCs or the like in the office of the client organization 20, whereas the wireless communication channel 30 is often used outside the office by users carrying a mobile information terminal, such as a smart phone, that is, both have different properties.

The traffic pattern of each client organization 20 reflects the characteristics of the business conducted by the client organization 20. For example, as for a business in which the number of visits to clients increases late in the afternoon, such as a bank, the peak of the traffic pattern of wireless communication occurs late in the afternoon. The traffic pattern of each type of business has a unique trend.

Figure 3A:
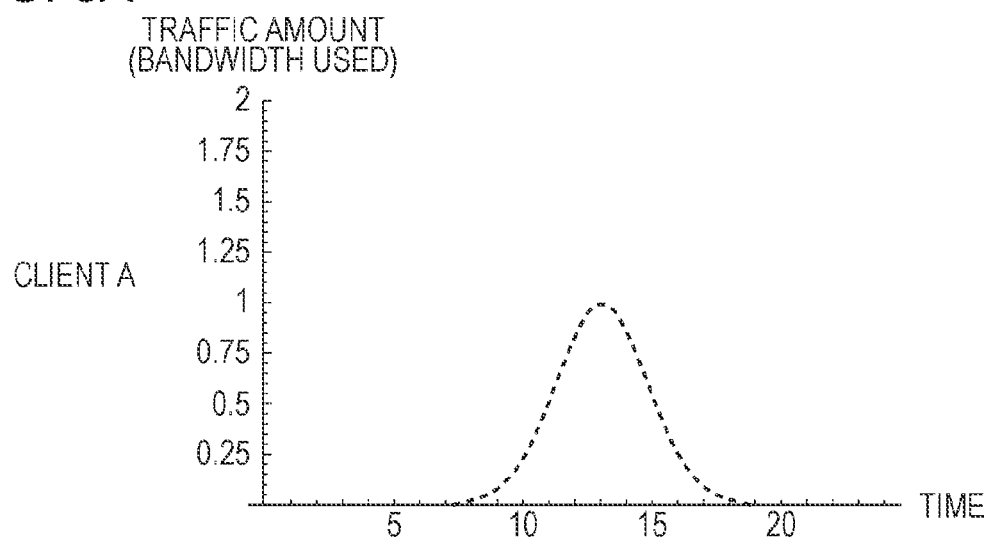
FIGS. 3A to 3C are diagrams illustrating an example of traffic patterns of client organizations.
Figure 3B:
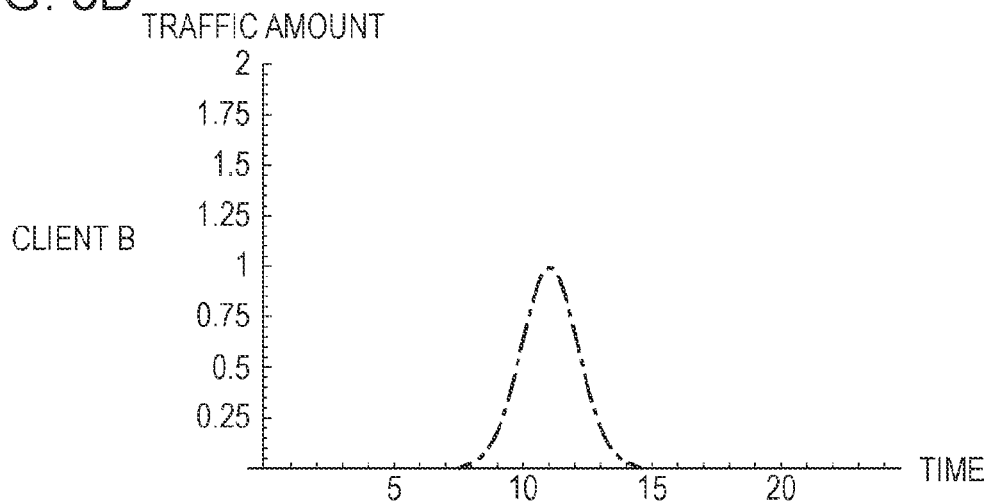
Figure 3C:
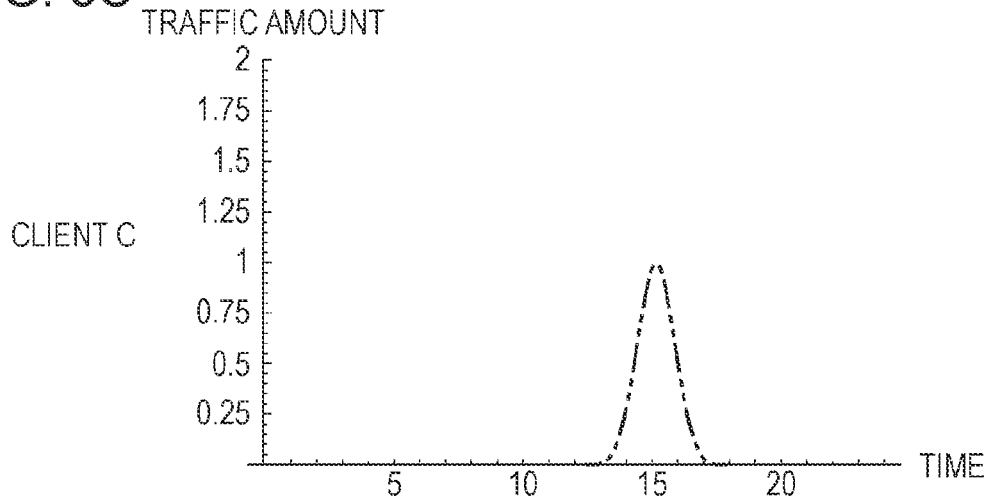

FIGS. 3A to 3C illustrate an example of traffic patterns of three client organizations (clients A to C). Note that these traffic patterns are merely examples, and actual traffic patterns do not necessarily have such a perfect bell shape.

The traffic patterns illustrated in FIGS. 3A to 3C are average traffic patterns obtained over twenty-four hours of a day. The horizontal axis indicates time from 0:00 a.m. to 24:00 a.m., and the vertical axis indicates a traffic amount (that is, the bandwidth used by the client organization). The traffic patterns of clients A to C illustrated in FIGS. 3A to 3C are different from one another in terms of the peak time of the traffic amount and the width of the bell shape.

FIG. 4 illustrates an example of data registered in the traffic pattern DB 102. In this example, traffic patterns themselves (raw data) and feature vectors of the traffic patterns are registered in association with identification information about the client organizations 20 (referred to as "client ID" in FIG. 4).

A feature vector of a traffic pattern is a vector representing a feature of the shape of the traffic pattern. For example, in the case of a traffic pattern of one day, a vector (Tmax, Bmax) in which a peak time Tmax of a traffic amount and a peak traffic amount (peak bandwidth) Bmax are components may be regarded as a feature vector. Also, when the vector (Tmax, Bmax) is expressed using polar coordinates, a vector (r, θ) in which a magnitude r of the vector and an amplitude θ are components may be regarded as a feature vector. Also, a vector composed of three components, that is, a peak time, a peak traffic amount, and a half-width (time width between times at which the traffic amount is half the peak traffic amount), or a vector composed of a magnitude r and two amplitudes θ and φ when the vector is expressed using polar coordinates, may be regarded as a feature vector.

A feature vector to be used may be determined in accordance with the complexity of shapes of traffic patterns. For example, when the traffic patterns of all the client organizations 20 may be adequately approximated by a Gaussian distribution shape, a feature vector composed of the above-described three components, that is, a peak time, a peak traffic amount, and a half-width, may be used. When there are traffic patterns having a more complicated shape, a feature vector composed of components that are sufficient for approximating the traffic patterns having the complicated shape with sufficient accuracy may be used. When patterns sufficiently approximate to the traffic patterns of all the client organizations 20 may be reproduced using feature vectors, it is not necessary to register raw data of traffic patterns in the traffic pattern DB 102.

Referring back to FIG. 2, when a new client organization 20 is added as a target to be provided with a service, a manager registers information about the client organization 20 in the system by using a client registering unit 114. Accordingly, an entry of the client organization 20 is created in the traffic pattern DB 102. At the time when a new client organization 20 is added, the traffic pattern of the client organization 20 is unknown. Thus, for example, a traffic pattern (and/or its feature vector) prepared as default may be temporarily registered as a traffic pattern of the client organization 20. Also, at the time of assigning a channel (described below), the communication channel 30 to be assigned to the new client may be determined by using the temporarily registered traffic pattern. In this case, while a service is being provided to the new client by using the assigned communication channel 30, the traffic pattern measuring unit 112 may measure an actual traffic pattern of the new client and register the traffic pattern in the traffic pattern DB 102, and reassignment of a communication channel 30 may be performed in accordance with the registered traffic pattern.

Here, plural types of default traffic patterns may be prepared, a traffic pattern suitable for the client organization 20 may be selected in accordance with information about the client organization 20 obtained through an interview or the like, and the selected traffic pattern may be temporarily registered. It is often the case that traffic patterns of individual business fields have different features. Thus, default traffic patterns may be prepared for individual business fields, so that a default traffic pattern of a business field is temporarily registered upon the business field related to a new client being input.

A channel feature DB 104 is a database that stores information about features of the individual communication channels 30 used by the service system 10. As illustrated in FIG. 5, for example, channel types representing the types of the individual communication channels 30 and channel bandwidths representing the bandwidths (communication-path capacity) of the communication channels 30 are registered in the channel feature DB 104 in association with identification information about the communication channels (channel IDs). The channel type is information indicating any of a bandwidth guarantee type and a best effort type. Also, in a case where the service system 10 uses wireless and wired communication channels 30, information indicating whether each of the communication channels 30 is wireless or wired is registered in the channel feature DB 104.

In the case of the bandwidth guarantee type, the bandwidth itself of the communication channel 30 rented from a communication carrier may be registered as a channel bandwidth. In the case of the best effort type, the bandwidth at the upper limit of the best effort of the communication channel 30 may be registered, or a pattern of temporal changes of an effective bandwidth (that is, effective transmission rate) of the communication channel 30 measured by a channel band measuring unit 118 may be registered.

Here, an effective bandwidth of the communication channel 30 is a bandwidth obtained by subtracting the bandwidth of the communication channel 30 used by a user other than the service system 10 (for example, another operator) from the upper-limit bandwidth of the best effort, that is, a bandwidth expected to be available in the service system 10. Of course, the effective bandwidth is not reliably guaranteed, but a certain level of high reliability is obtained by statistically obtaining an effective bandwidth by performing sample measurement that is sufficient to some extent.

For example, in a case where the operator of the service system 10 newly rents a best-effort-type communication channel 30 from a communication carrier, a manager of the operator may register the communication channel 30 in the channel feature DB 104 by using a channel registering/deleting unit 116, may cause the channel band measuring unit 118 to measure a temporal change pattern of the effective bandwidth of the communication channel 30, and may register the measurement result in the channel feature DB 104.

An assignable combination searching unit 109 searches for combinations of client organizations 20 assignable to the individual communication channels 30 used by the service system 10. According to a basic thought, for each communication channel 30, the assignable combination searching unit 109 searches for a combination of client organizations 20 whose total traffic pattern (that is, a traffic pattern obtained by adding traffic amounts at individual times expressed by individual traffic patterns) is acceptable by the channel bandwidth of the communication channel 30 among combinations of client organizations 20. Here, a single client organization 20 is also regarded as a "combination".

Figure 6A:
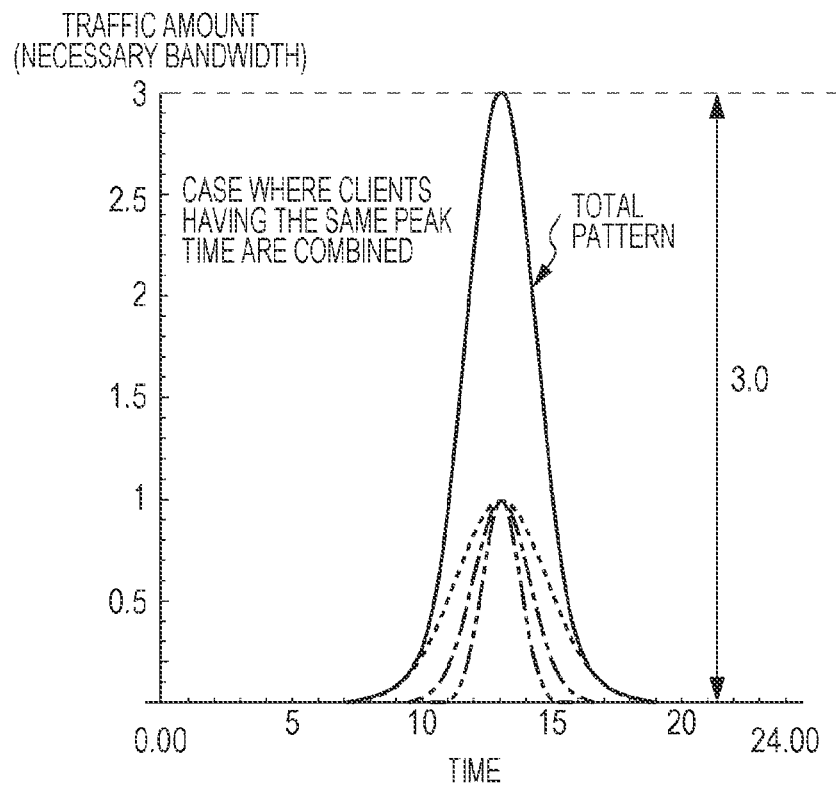
FIGS. 6A and 6B are diagrams describing a difference in total traffic pattern caused by a difference in combination of plural client organizations.
Figure 6B:
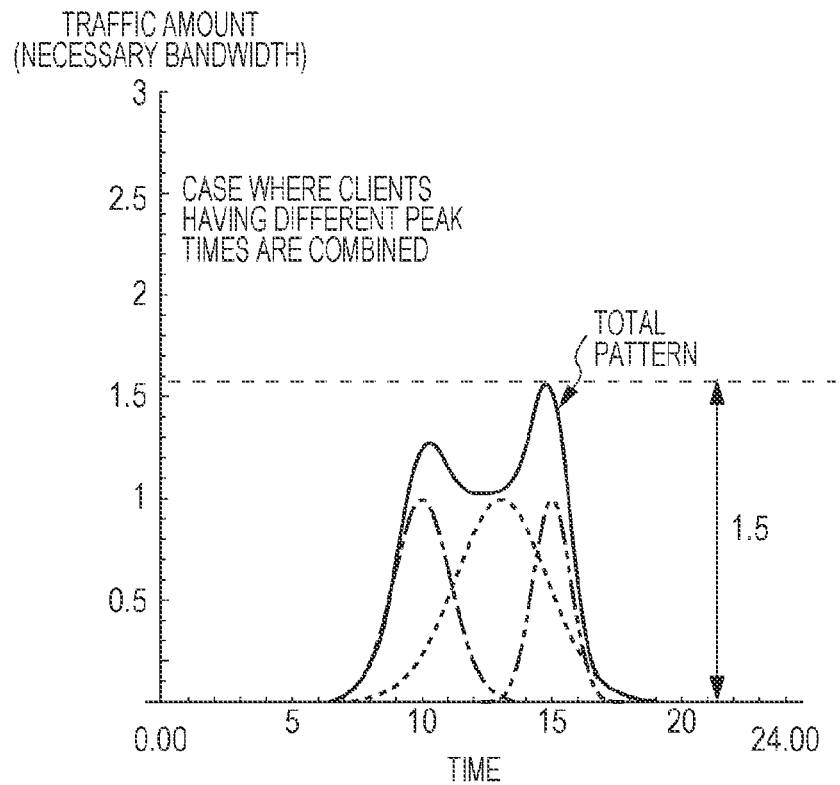

For example, a combination of the traffic patterns of clients A to C illustrated in FIGS. 3A to 3C (the peak traffic amount is "1" in each traffic pattern) will be discussed. When it is assumed that the peak times of the three traffic patterns are the same, the peak traffic amount of the total pattern of the three traffic patterns is "3", as illustrated in FIG. 6A, which is acceptable only by a communication channel 30 whose channel bandwidth is "3" or more (at least at the peak time). On the other hand, in the example illustrated in FIGS. 3A to 3C, the peak times of the three traffic patterns are different from one another, and the total pattern thereof is that illustrated in FIG. 6B. The peak value of the total pattern is "1.5", which is acceptable by a communication channel 30 whose channel bandwidth is "1.5" or more (at least at the peak time).

The traffic pattern of each client organization 20 and the channel bandwidth of each communication channel 30 (particularly in the case of the best effort type) are statistical to some extent and are not accurate. Thus, a case where a total pattern is "acceptable" by the channel bandwidth of a communication channel 30 is not necessarily a case where the total pattern is "completely" within the channel bandwidth (that is, the traffic amount does not exceed the channel bandwidth at every time of the pattern). For example, an allowable range may be provided for a channel bandwidth, such as an allowable range of +10%, and a determination "acceptable" may be performed if the total pattern is within the allowable range.

In the case of a best-effort-type communication channel 30, a combination of client organizations 20 may be obtained so that the total pattern of the combination is "acceptable" with respect to a temporal change pattern of the effective bandwidth of the communication channel 30.

When the service system 10 uses wireless and wired communication channels 30, the assignable combination searching unit 109 searches for a combination to be assigned to the wireless communication channel 30 in accordance with the traffic patterns of wireless communication of the individual client organizations 20, and searches for a combination to be assigned to the wired communication channel 30 in accordance with the traffic patterns of wired communication of the individual client organizations 20.

The assignable combination searching unit 109 may cluster the client organizations 20 on the basis of similarity in the traffic patterns, and may determine a combination of clusters assignable to the each communication channel 30. Clustering may be performed on the basis of, for example, the distances between feature vectors of the traffic patterns of the individual client organizations 20 (distances in a space in which individual components of feature vectors are coordinate axes). That is, the client organizations 20 having similar feature vectors may be grouped into a cluster.

For example, many samples of traffic patterns corresponding to various feature vectors may be generated by performing simulation, and determination of whether or not various combinations of the traffic patterns are acceptable may be performed on each communication channel 30. Accordingly, a range of feature vectors of individual traffic patterns constituting a "combination" acceptable by each communication channel 30 is obtained. This range may be regarded as a cluster. Clustering may be performed in a similar manner by using actual traffic patterns of the client organizations 20 as samples, instead of using traffic patterns generated through simulation as samples. In this way, the ranges of individual clusters and combinations of clusters assignable to the individual communication channels 30 are obtained. A combination of clusters assignable to a communication channel 30 corresponds to a combination of client organizations 20 assignable to the communication channel 30 expressed by a combination of clusters to which the client organizations 20 belong. When the service system 10 uses wireless and wired communication channels 30, a combination of clusters assignable to the wireless communication channel 30 may be obtained in accordance with the traffic patterns of wireless communication of the individual clients, and a combination of clusters assignable to the wired communication channel 30 may be obtained in accordance with the traffic patterns of wired communication of the individual clients.

Figure 7:
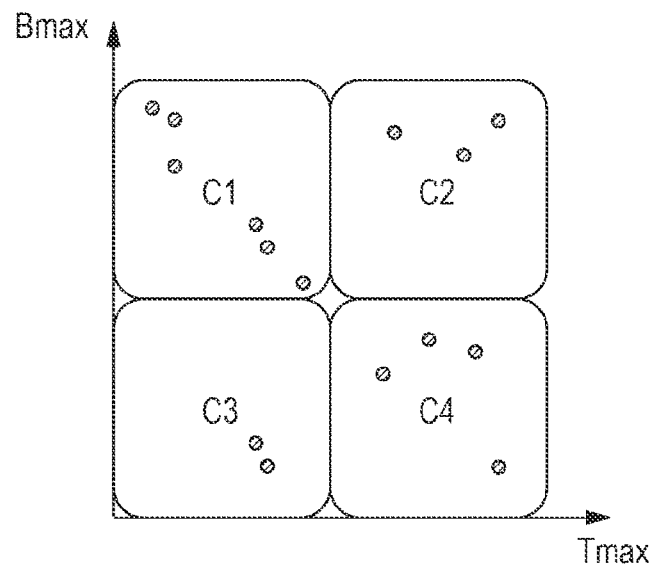
FIG. 7 is a diagram illustrating an example of clustering of feature vectors of traffic patterns.
Figure 8:
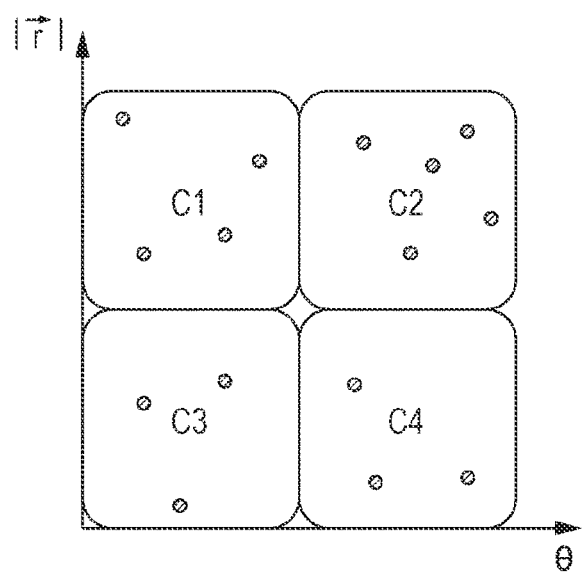
FIG. 8 is a diagram illustrating an example of clustering of feature vectors of traffic patterns.

For example, FIG. 7 illustrates four clusters C1 to C4 formed in a feature space of a feature vector having a peak bandwidth Bmax and a peak time Tmax as components. FIG. 8 illustrates four clusters C1 to C4 formed in a feature space of another feature vector $(r, \theta)$, which is obtained by transforming the foregoing feature vector using polar coordinates. In both figures, individual circles in the clusters represent (the feature vectors of) the individual client organizations 20.

Figure 9:
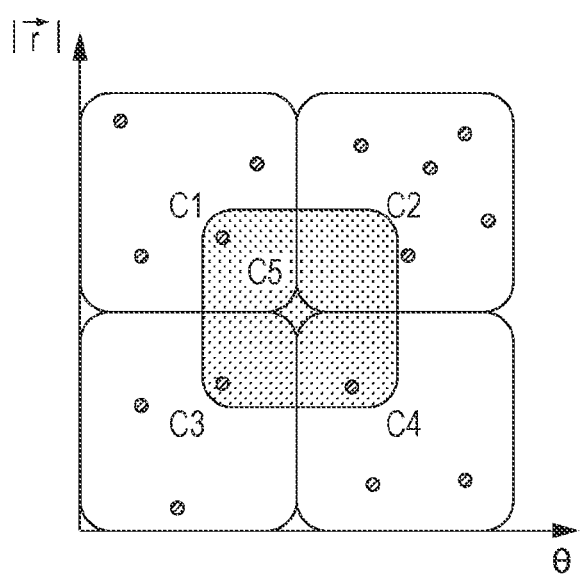
FIG. 9 is a diagram illustrating an example of clustering in which partial overlap of clusters is allowed.

In the examples illustrated in FIGS. 7 and 8, the clusters do not overlap one another, but clustering may be performed so that the clusters partially overlap with one another. FIG. 9 illustrates an example in which clusters partially overlap one another. In the example illustrated in FIG. 9, cluster C5 partially overlaps clusters C1 to C4. In such a case where clusters partially overlap one another, the client organizations 20 (feature vectors) belonging to the overlapped portion may be regarded as client organizations 20 belonging to all the clusters that overlap.

Information about clustering that has been obtained is registered in a pattern cluster information DB 106. FIG. 10 illustrates an example of data content of the pattern cluster information DB 106. In this example, definition of ranges of clusters is registered in the pattern cluster information DB 106 in association with identification information about the individual clusters (cluster IDs). FIG. 10 illustrates an example of clustering feature vectors $(r, \theta)$ in polar coordinate expression. Here, the coordinates of the center of a feature space of a feature vector $(r, \theta)$ and the radius thereof are used to define the range of a cluster. That is, in this example, a cluster is a region inside a circle defined by a center and a radius. Such a circular cluster is merely an example, and the shape of a cluster is not specified.

When the service system 10 uses wireless and wired communication channels 30, clustering may be performed for each of wireless and wired.

The combinations of clusters assignable to the individual communication channels 30, searched by the assignable combination searching unit 109, are registered in an assignable combination DB 108. FIG. 11 illustrates an example of data content of the assignable combination DB 108. In this example, combinations of clusters assignable to the communication channels 30 are registered in the assignable combination DB 108 in association with the identification information about the respective communication channels 30 (channel IDs). In the example illustrated in FIG. 11, (1) a combination of two client organizations 20 belonging to cluster C1, (2) a combination of one client organization 20 belonging to cluster C1, one client organization 20 belonging to cluster C2, and one client organization 20 belonging to cluster C3, and (3) a combination of one client organization 20 belonging to cluster C1 and two client organizations 20 belonging to cluster C3, are assignable to the communication channel "Ch2".

In the example illustrated in FIG. 11, only combinations of the upper limit in terms of a traffic amount, among combinations of clusters assignable to the individual communication channels 30, are registered in the assignable combination DB 108. That is, when a combination "C1+C2" is assignable to channel Ch1, a combination "C1" (only one client belonging to cluster C1) and a combination "C2" (only one client belonging to cluster C2) is of course assignable, but such combinations are omitted.

As for a bandwidth-guarantee-type communication channel 30, an assignable combination of clusters is determined in accordance with a channel bandwidth (communication-path capacity). Thus, as for a group of bandwidth-guarantee-type communication channels 30, combinations of clusters may be registered in the assignable combination DB 108 in accordance with the channel bandwidths thereof, instead of individually registering combinations of clusters assignable to the individual communication channels 30.

When a communication channel 30 newly rented from a communication carrier is to be registered in the channel feature DB 104 by the channel registering/deleting unit 116, the assignable combination searching unit 109 may obtain, for the communication channel 30, an assignable combination of clusters, and may register the combination in the assignable combination DB 108.

A channel assignment determining unit 110 determines combinations of client organizations 20 for the individual communication channels 30 used by the service system 10. The determination of combinations is performed with reference to the traffic pattern DB 102, the pattern cluster information DB 106, and the assignable combination DB 108.

In a process of determining combinations, first, the clusters to which the individual client organizations 20 belong are specified on the basis of the feature vectors of the client organizations 20 registered in the traffic pattern DB 102 by referring to the pattern cluster information DB 106. For example, in a case where the feature vector of client A is in the range of cluster C1, it is determined that cluster C1 is a cluster to which client A belongs. In a case where one client belongs to plural clusters, it is determined that all the plural clusters are clusters to which the client belongs. After the clusters to which all the client organizations 20 belong have been determined, combinations of client organizations 20 to be assigned to the individual communication channels 30 are obtained so that combinations of clusters assignable to the communication channels 30 stored in the assignable combination DB 108 are satisfied and that each of the client organizations 20 is assigned to any one of the communication channels 30.

For example, assume a simple example in which the communication channels 30 used by the service system 10 are channels Ch1 and Ch2 and there are five client organizations including clients A and B belonging to cluster C1 and clients C, D and E belonging to cluster C2. In this example, it is assumed that a combination assignable to channel Ch1 is "C1+C2", and combinations assignable to channel Ch2 are "C1+C1+C2" and "C1+C2+C2". In this case, any of 2×3=6 combinations is assignable to channel Ch1, and any of 1×3+ 2×3=9 combinations is assignable to channel Ch2. Among these combinations, combinations which enable assignment of clients A to E to channels Ch1 and Ch2 without redundancy to satisfy the above-described assignable combinations of clusters are six combinations in total, in which a combination of one client belonging to cluster C1 and one client belonging to cluster C2 is assigned to channel Ch1 (there are six such combinations) and a combination of the other client belonging to cluster C1 and the other two clients belonging to cluster C2 is assigned to channel Ch2. Any one of the six combinations may be adopted.

The channel assignment determining unit 110 determines combinations of client organizations 20 to be assigned to the individual communication channels 30 in the above-described manner. The total pattern of traffic patterns of the client organizations 20 belonging to the combination assigned to a certain communication channel 30 is acceptable by the certain communication channel 30.

A process of determining assignment by the channel assignment determining unit 110 is performed when, for example, a client organization 20 is newly registered by the client registering unit 114. According to an example, an existing assignment state is completely cleared, and the process of determining assignment is performed on all the client organizations 20 including the newly registered client organization 20. If the traffic pattern of the newly registered client organization 20 is unknown just after registration, a default traffic pattern (and its feature vector) may be temporarily registered as information about the client organization 20, and the process of determining assignment may be performed by using the information. Alternatively, after a certain time period has elapsed since provision of a service to the new client organization 20 started, and after an actual traffic pattern of the new client organization 20 has been obtained, the process of determining assignment may be performed again on all the client organizations 20 by using the feature vectors of the actual traffic patterns.

In a case where a new client organization 20 has been added, recalculation for assignment may be performed on only one or some of the communication channels 30, and the assignment for the other communication channels 30 may be maintained, unlike in the above-described case where the existing assignment state is completely cleared and recalculation for assignment is performed again. For example, a predetermined number or ratio of communication channels 30 may be selected as targets of recalculation for assignment in descending order of allowance of the channel bandwidth with respect to the total pattern of the traffic pattern of the assigned client organizations 20.

When recalculation for assignment is performed after a client organization 20 has been newly added, if combinations for assigning each of the client organizations 20 including the new client organization 20 to any one of the communication channels 30 are not obtained even if combinations of clients are changed in any way within the range of combinations of clusters registered in the assignable combination DB 108, the channel assignment determining unit 110 notifies the manager that the communication channels 30 are insufficient. In response to the notification, the manager rents a new communication channel 30 from a communication carrier, registers it in the channel feature DB 104, causes the assignable combination searching unit 109 to search for a combination of clusters assignable to the new communication channel 30, and registers the combination in the assignable combination DB 108. Also, for example, the manager assigns the newly added client organization 20 to the new communication channel 30.

In this way, a communication channel 30 is added only when the existing communication channels 30 become insufficient for all the client organizations 20 due to an increase in the number of client organizations 20. Accordingly, the number of communication channels 30 is minimized, which decreases the possibility of increasing the cost for the communication channels 30.

Also, in a case where a client organization 20 which is provided with a service from the service system 10 has been deleted, the channel assignment determining unit 110 may recalculate the assignment of the residual client organizations 20 to the communication channels 30. In the recalculation, whether or not the residual client organizations 20 are acceptable may be determined without using any of the communication channels 30 that are being used. If a communication channel 30 to which any client organization 20 is not assignable is generated through the recalculation, the communication channel 30 may be reserved as a spare or may be returned to the communication carrier (cancellation of the contract).

Also, the traffic pattern measuring unit 112 may continuously measure the traffic patterns of the individual client organizations 20 and regularly update the traffic patterns of the individual client organizations 20 registered in the traffic pattern DB 102 on the basis of the measurement result, and the channel assignment determining unit 110 may regularly recalculate the assignment of the individual client organizations 20 to the communication channels 30 in accordance with the regular update. With such regular recalculation, excess or deficiency of the communication channels 30 may be determined, and measures may be taken, for example, a communication channel 30 is added if there are not sufficient communication channels 30, and a communication channel 30 is returned if there is an excess of the communication channels 30.

An assignment result of the client organizations 20 to the communication channels 30, which is obtained by the channel assignment determining unit 110, is registered in the channel assignment DB 120. FIG. 12 illustrates an example of data content of the channel assignment DB 120. In this example, the IDs of the communication channels 30 to which the client organizations 20 are assigned are registered in the channel assignment DB 120 in association with the client IDs of the client organizations 20. The channel assignment DB 120 is used for a basic channel selection process performed by the traffic controller 200.

That is, when receiving transmission data addressed to a terminal 22 belonging to a certain client organization 20 from the service system 10, the traffic controller 200 searches the channel assignment DB 120 for the communication channel 30 corresponding to the client organization 20, and transmits the transmission data to the terminal 22 via the communication channel 30. However, channel assignment registered in the channel assignment DB 120 is based on a traffic pattern, which is a trend of relatively long-term changes in traffic amount, and thus overflow of the communication channels 30 may occur if the traffic amount of the client organizations 20 suddenly increases. For this reason, in the exemplary embodiment, a controller is provided to address such a sudden increase in the traffic amount. This will be described in detail below with reference to FIG. 14 and so forth.

Referring back to FIG. 2, the channel assignment determining unit 110 obtains, for each of the communication channels 30, the total pattern of the traffic patterns of the client organizations 20 assigned to the communication channel 30 in accordance with a result of assignment of the individual client organizations 20 to the communication channels 30, and registers the total patterns in the total pattern DB 122. FIG. 13 illustrates an example of data content of the total pattern DB 122. The total patterns registered in the total pattern DB 122 may be raw patterns (that is, waveforms representing temporal changes in traffic amount in a predetermined period), or may be feature vectors that enable reproduction of the raw patterns. The total pattern DB 122 is used by a controller for addressing the above-described sudden increase in traffic amount.

Hereinafter, the details of the traffic controller 200 will be described with reference to FIG. 14. In the following example, the traffic controller 200 controls transmission of data to the communication channels 30 in a case where the service system 10 distributes the data to the terminals 22 in the client organizations 20.

In this example, individual users in the individual client organizations 20 instruct the service system 10 to distribute data. The service system 10 includes, as illustrated in FIG. 14, a distribution instruction accepting unit 250 that accepts instructions to distribute data from the individual users. Distribution instructions provided by the users may be of an immediate type for providing instruction to distribute data as quickly as possible, or a reservation type in which a distribution time is specified. A distribution instruction of the reservation type may be used in conjunction with a schedule management application or groupware. For example, in a case where the service system 10 provides a service such as a schedule management application to a client organization 20, the schedule management application accepts, in association with a schedule registered by a user (for example, "10:00-11:00 meeting"), specification of data such as document data used in the schedule, and provides a distribution instruction (in other words, distribution reservation) to distribute the specified data at the time specified in the schedule to the distribution instruction accepting unit 250.

The data to be distributed is held in, for example, a distribution DB 260. For example, a database for an online storage service or an online document creation/storage service provided by the service system 10 is an example of the distribution DB 260. In this example, a schedule management application or the like may provide an input screen for data to be distributed corresponding to a registered schedule, call a list of data stored using an online storage service or the like, and accept the data to be distributed from the list. The number of distribution DBs 260 is not limited to one. For example, databases for the individual services provided by the service system 10 may be used as distribution DBs 260.

In both cases of the immediate type and the reservation type, "importance" or "priority" (hereinafter collectively referred to as "importance") may be specified for a distribution instruction (or data to be distributed). As the importance increases, a distribution time specified by a user is more likely to be kept (that is, a time lag between a time point when a distribution instruction is accepted (immediate type) or a reservation time (reservation type) and a time point when data is actually distributed is small). The importance of a distribution instruction may be specified by a user, or a fixed value may be predetermined for each client organization 20. The latter may be realized by, for example, setting the importance (or allowable delay time for a specified distribution time) when each client organization 20 makes a contract. In this case, a range of selectable degrees of importance may be specified in a contract for each client organization 20, so that a user is capable of selecting a desired degree of importance within the range when providing a distribution instruction.

Whether a distribution instruction is of the immediate type or reservation type is automatically determined in accordance with a service for which a distribution instruction in input. For example, a distribution instruction associated with a schedule registered in a schedule management application is of the reservation type, whereas a distribution instruction provided for a data transfer service is of the immediate type.

When providing a distribution instruction, a user may specify a destination of data to be distributed as well as the data to be distributed and a distribution time. The destination is, for example, a mobile terminal of the user, or a server or digital multifunction peripheral in the client organization 20 to which the user belongs. The user may select one of these destinations when providing a distribution instruction. There may be a service form in which a destination is automatically set upon a user who has provided a distribution instruction being specified, such as a case where a destination is fixed to a mobile terminal of the user.

Information about a distribution instruction accepted by the distribution instruction accepting unit 250 is stored in a distribution schedule memory 252. FIG. 15 illustrates an example of data content stored in the distribution schedule memory 252. In this example, for each piece of identification information of a distribution instruction (instruction ID), the ID of the client organization 20 to which the user who has issued the distribution instruction belongs (client ID), the user ID of the user, address information about a destination (distribution destination), identification information about the data to be distributed (distribution data ID, the data itself to be distributed exists in the distribution DB 260), a specified distribution time, and a distribution guarantee time are registered. The specified distribution time is an acceptance time of a distribution instruction in the case of an immediate-type distribution instruction, and is a reservation time in the case of a reservation-type distribution instruction (for example, a start time in a schedule registered for a schedule management application or the like). The distribution guarantee time is a guaranteed time by which the data is to be distributed. The distribution guarantee time is determined in accordance with a specified distribution time and importance. For example, an allowable delay time is determined in accordance with specified importance, and the allowable delay time is added to the specified distribution time, thereby obtaining a distribution guarantee time. The relationship between importance and an allowable delay time is preset in the service system 10.

Figure 14:
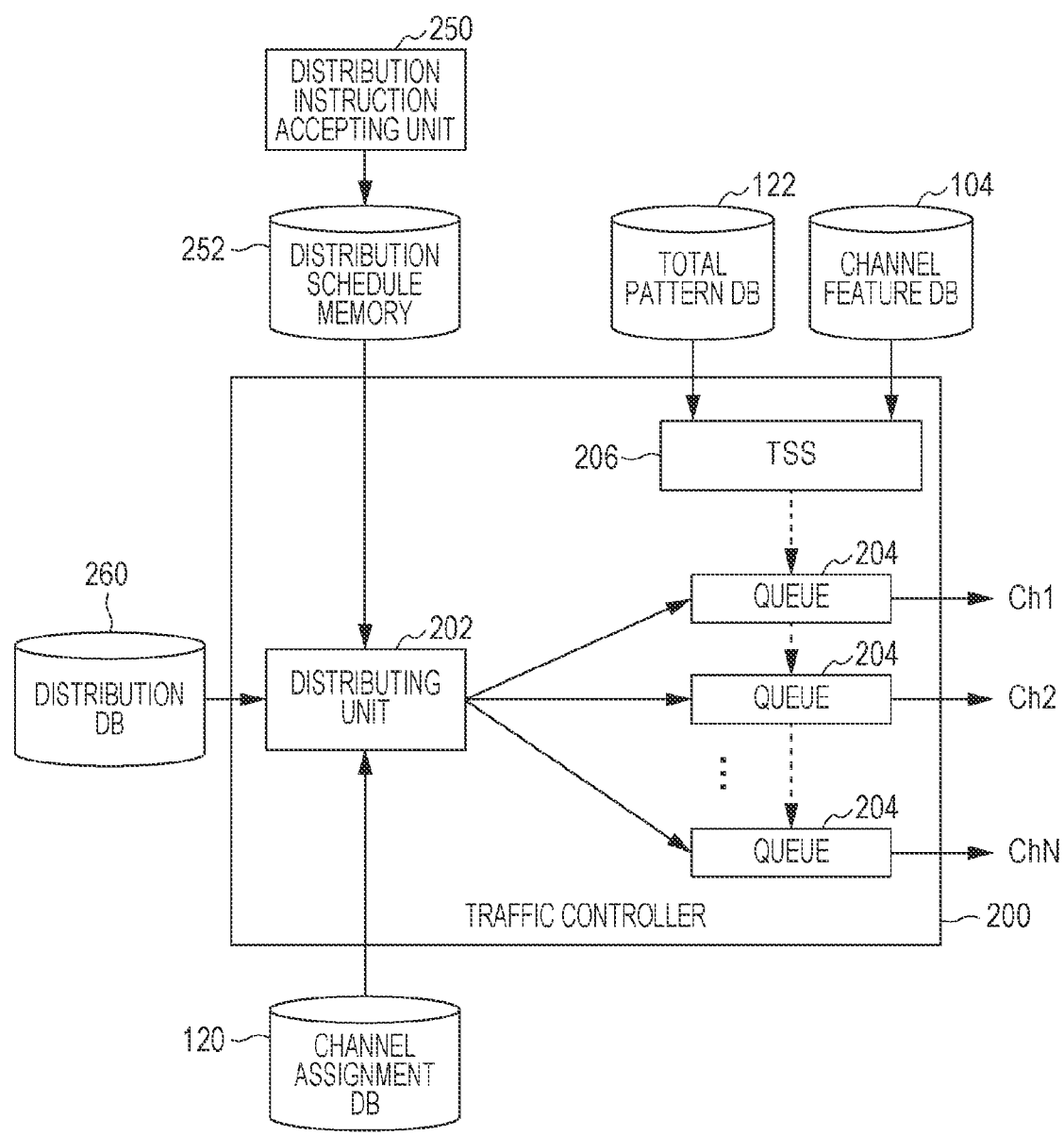
FIG. 14 is a diagram illustrating an example of a configuration of a traffic controller.

The traffic controller 200 illustrated in FIG. 14 includes a distributing unit 202, queues 204 corresponding to the individual communication channels 30, and a traffic shaper switcher (TSS) 206.

The distributing unit 202 selects, from the distribution schedule memory 252, a distribution instruction related to a specified distribution time that has come, obtains data to be distributed, which is specified in the selected distribution instruction, from the distribution DB 260, and inserts the data into the queue 204 of the corresponding communication channel 30 (enqueue). At this time, "the corresponding communication channel 30" is specified by recognizing a client ID with reference to information about the selected distribution instruction and searching the channel assignment DB 120 for the communication channel 30 assigned to the client ID. Also, "the specified distribution time that has come" is, more strictly, the time earlier than the specified distribution time by a time period of delay caused by the queue 204 or delay caused by transmission via a network, such as the Internet. The distributing unit 202 divides the data to be distributed into packets, embeds information about a destination and information about a distribution guarantee time in the header of each packet, and then inserts the data into the queue 204.

The queue 204 is a buffer that holds plural pieces of data to be distributed using a first-in first-out (FIFO) scheme. That is, pieces of data to be distributed that have been inserted into the queue 204 are output to the corresponding communication channel 30 using the FIFO scheme. Some time is taken from when the data to be distributed is inserted into the queue 204 (enqueue) to when the data is output to the corresponding communication channel 30 (dequeue), that is, a delay occurs. In this delay time, the TSS 206 adjusts the data to be distributed (packets) in the queue 204 in the following manner so as to prevent overflow of the communication channel 30 corresponding to the queue 204.

The TSS 206 monitors the queues 204 corresponding to the individual communication channels 30, and performs control to prevent overflow of the communication channels 30. The control is composed of two stages, that is, (1) traffic shaping and (2) chipping and switching.

Traffic shaping is a control scheme of causing a delay (shift to a later time) of the data to be distributed (packets) in the queue 204, thereby preventing excess over the bandwidth of the corresponding communication channel 30. Traffic shaping may also be referred to as packet shift. The upper limit of a delay is a distribution guarantee time. That is, this control scheme prevents delay beyond a corresponding distribution guarantee time of individual pieces of data to be distributed.

In a case where overflow of the communication channel 30 occurs (a traffic amount exceeds the channel bandwidth of the communication channel 30) only by performing traffic shaping, chipping and switching control is performed. In this control scheme, packets that exceed the bandwidth of the corresponding communication channel 30 among the packets in the queue 204 are chipped (chipping), and the chipped packets are switched to another available communication channel 30 (switching).

According to an example, in the configuration illustrated in FIG. 14, a communication channel 30 having a large allowance of a channel bandwidth with respect to the total pattern of traffic patterns of the assigned client organizations 20 is selected as the communication channel 30 to which the chipped packets are to be switched. That is, for each of the other communication channels 30, the channel bandwidth of the communication channel 30 is obtained from the channel feature DB 104, the total pattern thereof is obtained from the total pattern DB 122, the traffic amount at the current time is obtained from the total pattern, and the traffic amount at the current time is subtracted from the channel bandwidth. A result of the subtraction corresponds to an available bandwidth of the communication channel 30. For example, one or more communication channels 30 enough to acquire the capacity for accepting the traffic amount of the chipped packets are selected in descending order of the available bandwidth (available capacity). Then, the chipped packets are inserted into the queues 204 corresponding to the selected communication channels 30.

According to another example, a communication channel 30 having an available current time slot (CT) is searched for, and the chipped packets are inserted into the CT of the queue 204 of the found communication channel 30. If only one available communication channel 30 is insufficient for accepting the total traffic amount of the chipped packets, the chipped packets may be dispersed to the CTs of plural available communication channels 30. The TSS 206 monitors the queues 204 corresponding to all the communication channels 30, and is thus capable of performing such control.

According to still another example, a communication channel 30 to which overflowed packets are to be switched may be prepared. In this scheme, a small number of client organizations 20 are assigned to the prepared communication channel 30 so that the communication channel 30 has a sufficient available bandwidth.

Figure 16:
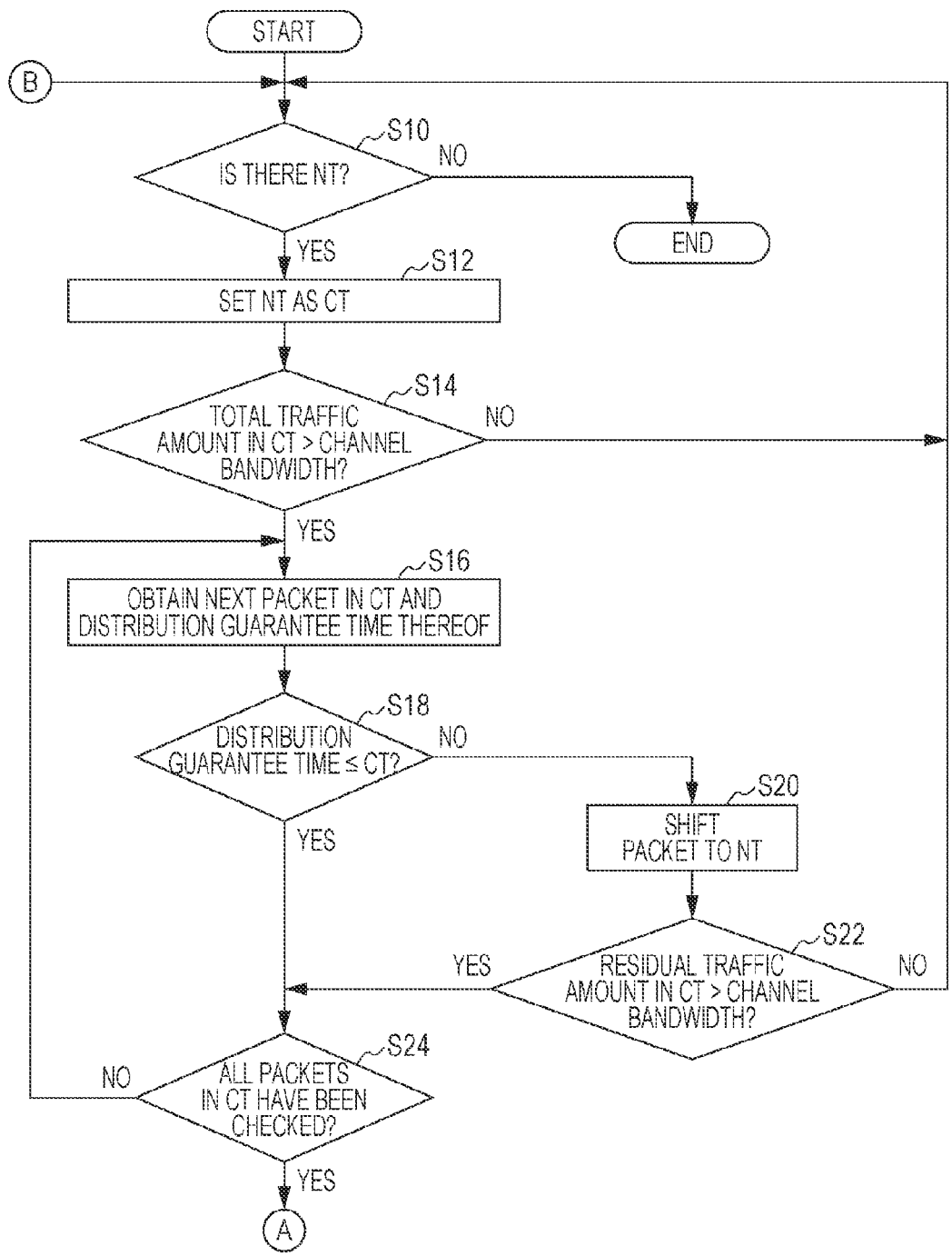
FIG. 16 is a diagram illustrating an example of a procedure of traffic shaping (packet shift) performed by a traffic shaper switcher.
Figure 17:
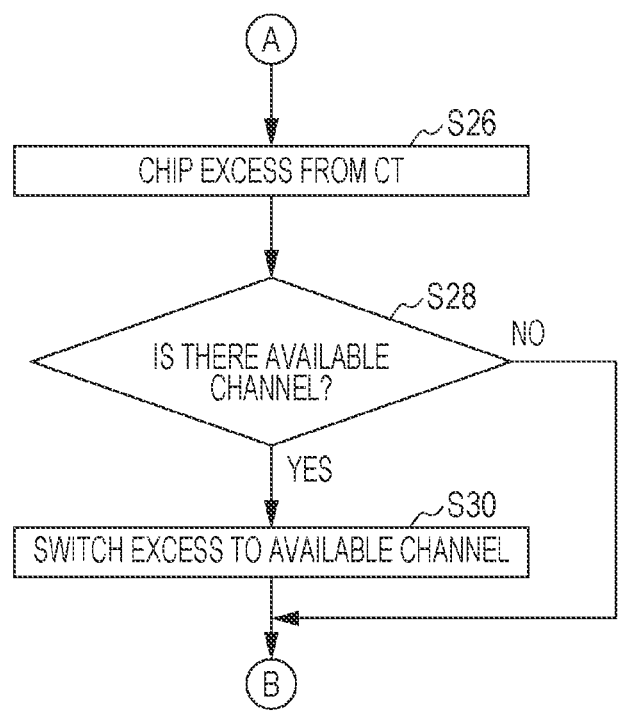
FIG. 17 is a diagram illustrating an example of a procedure of chipping and switching performed by the traffic shaper switcher.

An example of a process procedure of the TSS 206 is illustrated in FIGS. 16 and 17. FIG. 16 illustrates a procedure of traffic shaping, and FIG. 17 illustrates a procedure of chipping and switching. The procedures illustrated in FIGS. 16 and 17 are for one queue 204 (one communication channel 30). The TSS 206 performs the procedures on each of the queues 204.

As the assumption of the procedures, time slots are specified for each of the queues 204, as illustrated in FIG. 18, and the packets in the same time slot are output to the communication channel 30 at the same time. FIG. 18 illustrates, on the left side, temporal transition of traffic amounts of two clients A and B assigned to one communication channel 30, and temporal transition of the total traffic amount as the sum of the traffic amounts of two clients A and B from the top. In FIG. 18, shaded squares in time slots represent individual packets, and the number in each square represents the distribution guarantee time of the packet. For example, when the number in a square is "1", the distribution guarantee time of the packet is time t1 in FIG. 18. The total traffic amount of clients A and B exceeds the bandwidth of the communication channel 30, as illustrated in the lowermost portion of the left side of FIG. 18.

In the procedure illustrated in FIG. 16 (traffic shaping), the TSS 206 sequentially processes the time slots in a target queue 204 from the time slot of the earliest time, and repeats the process until all the time slots in the queue 204 have been processed.

First, the TSS 206 determines whether or not there is an unprocessed next time slot (NT) in step S10. If there is an unprocessed NT, the TSS 206 sets the NT as a current time slot (CT) in step S12. Subsequently, the TSS 206 determines in step S14 whether or not the total traffic amount in the CT (the total amount of the packets of clients A and B) exceeds the channel bandwidth (capacity) of the communication channel 30. If the total traffic amount does not exceed the channel bandwidth, the process returns to step S10, where the TSS 206 determines whether or not there is an unprocessed NT.

When the communication channel 30 is of the best effort type, the channel bandwidth corresponding to the CT in the temporal change pattern of the channel bandwidth of the communication channel 30 registered in the channel feature DB 104 may be used as the channel bandwidth serving as a reference of the determination performed in step S14.

If it is determined in step S14 that the total traffic amount exceeds the channel bandwidth, the TSS 206 extracts an unprocessed packet in the CT in step S16, and determines whether or not the distribution guarantee time of the extracted packet is the same as or before the CT in step S18. If the result of the determination is negative (NO), that is, if the distribution guarantee time of the packet is after the CT, the packet is shifted to the NT in step S20. Accordingly, the total traffic amount of the CT decreases by one packet. Subsequently, the TSS 206 determines in step S22 whether or not the total traffic amount of the CT that has decreased by one packet still exceeds the channel bandwidth. If the total traffic amount does not exceed the channel bandwidth (NO), the process returns to step S10 and the NT is processed. If the total traffic amount exceeds the channel bandwidth (YES), the process proceeds to step S24.

On the other hand, if the determination result in step S18 is positive (YES), that is, if the distribution guarantee time of the packet is the same as or before the CT, the packet is left in the CT, and the process proceeds to step S24.

In step S24, the TSS 206 determines whether or not the check in step S18 (and the process in steps S20 and S22 if necessary) has been performed on all the packets in the CT. If the check has not been performed on all the packets, the process returns to step S16, where the next unprocessed packet is extracted from the CT, and the process is repeated from step S18.

In the example illustrated in FIG. 18, the traffic with packets that exceed the channel bandwidth at some time points before packet shift (traffic shaping) is shaped into the traffic in which all the packets do not exceed the channel bandwidth after repetition of the process from step S16 to step S24.

However, overflow of the communication channel 30 may not be eliminated only by performing packet shift. In this case, a chipping and switching process in the second stage is performed.

That is, if the determination result in step S24 is YES (that is, if the determination in step S18 has been performed on all the packets in the CT), the traffic amount in the CT at the time exceeds the channel bandwidth. Thus, the process illustrated in FIG. 17 is performed.

In the procedure illustrated in FIG. 17, the TSS 206 selects the packets that exceed the channel bandwidth of the corresponding communication channel 30 among the packets remaining in the CT, as a target to be deleted (chipped) from the CT in step S26. In step S28, the TSS 206 searches for an available communication channel 30 to which the chipped packets are to be switched.

According to an example, in step S28, a communication channel 30 whose available capacity (="(channel bandwidth)−(traffic amount at CT in the total pattern)") is larger than the total traffic amount of the chipped packets is selected as the channel to which the packets are to be switched from among the other communication channels 30. If there is no communication channel 30 whose available capacity is larger than the total traffic amount of the chipped packets, plural communication channels 30 whose total available capacity is equal or larger than the total traffic amount are selected.

According to another example, in step S28, the TSS 206 obtains, for each of the other communication channels 30, the available capacity of the CT on the basis of the channel bandwidth of the communication channel 30 and the traffic amount in the CT of the queue 204 corresponding to the communication channel 30. Then, a combination of the communication channels 30 in which the total sum of the available capacities of the CTs is equal to or larger than the total traffic amount of the packets chipped in step S26 (or a single communication channel 30 if it is sufficient) is selected as an available channel to which the chipped packets are to be switched.

Subsequently, the TSS 206 deletes (chips) the packets to be chipped from the CT in step S26, and switches the chipped packets to the one or more communication channels 30 selected in step S28 in accordance with the available capacities of the individual communication channels 30 (or CTs) in step S30. Accordingly, the traffic amount in the CT decreases to equal to or smaller than the channel bandwidth, and thus overflow of the corresponding communication channel 30 may be prevented.

If a combination of communication channels 30 that is capable of accepting the total traffic amount of the packets selected as a target to be chipped in step S26 is not found in step S28, chipping and switching of the selected packets is not performed in the procedure illustrated in FIG. 17, and the packets are left in the CT. In this case, handling of the excess packets in the CT is left to the communication channel 30 side. Alternatively, if a combination of communication channels 30 that is capable of accepting the total traffic amount of the packets selected as a target to be chipped is not found in step S28, the selected packets may be deleted from the CT (packet drop).

In the above-described example, if a combination of communication channels 30 that is capable of accepting the total traffic amount of the packets selected as a target to be chipped is not found in step S28, switching of the excess packets is not performed at all, but this is merely an example. Alternatively, the packets corresponding to the available capacity of the communication channels 30 among the excess packets may be switched to the communication channels 30 having the available capacity, and the residual packets that are not switched may be left in the CT or dropped.

After step S30 has been performed, the process for the CT ends. Then, the TSS 206 returns to step S10, and performs the process on the NT.

The above-described procedure is merely an example. According to a modification example, in step S16 in FIG. 16, the packet whose distribution guarantee time is the latest may be extracted from among the packets in the CT. Accordingly, distribution of packets having a later distribution guarantee time is put off, and packets are sequentially distributed from the one having the earliest distribution guarantee time. In this case, it may be determined in step S24 whether or not there is a packet whose distribution guarantee time is later than the CT in the CT.

In the description given above, the traffic control according to the exemplary embodiment is applied to a data distribution process related to a distribution instruction from a user. However, the traffic control according to the exemplary embodiment is applicable to another process. For example, the control according to the exemplary embodiment is applicable to distribution of data from the service system 10 to the terminal 22 in machine to machine communication (so-called M2M).

The above-described communication management system 100 and traffic controller 200 may be realized by, for example, causing a multi-purpose computer to execute a program representing processes of the above-described functional modules. Here, the computer has a circuit configuration as hardware in which a microprocessor such as a central processing unit (CPU), a memory (primary storage) such as a random access memory (RAM) and a read only memory (ROM), a hard disk drive (HDD) controller that controls an HDD, various input/output (I/O) interfaces, and a network interface that performs control for connecting to a network, such as a local area network, are connected to one another via a bus. Also, a disk drive for reading data from and/or writing data on a portable disk recording medium, such as a compact disk (CD) or a digital versatile disk (DVD), a memory reader/writer for reading data from and/or writing data on a portable nonvolatile recording medium of various standards, such as a flash memory, or the like may be connected to the bus via, for example, an I/O interface. The program describing the processes performed by the above-described individual functional modules is stored in a fixed storage device, such as a hard disk drive, via a recording medium such as a CD or DVD, or via a communication medium such as a network, and is installed into the computer. When the program stored in the fixed storage device is read out to the RAM and is executed by the microprocessor such as a CPU, the above-described functional modules are realized.

The functional modules of the above-described communication management system 100 or traffic controller 200 may be mounted in plural computers capable of communicating with one another via a network in a distributed manner, and the functional modules may communicate with one another via the network, so that the functions of the communication management system 100 or traffic controller 200 may be realized.

Also, some or all of the functional modules of the communication management system 100 or traffic controller 200 may be configured as a hardware circuit, such as a dedicated large scale integration (LSI), an application specific integrated circuit (ASIC), a field programmable gate array (FPGA), or a discrete circuit element.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication management method comprising:
   measuring, for each of clients, a traffic pattern representing a pattern of temporal changes in an amount of communication traffic regarding the client;
   assigning, to each of a plurality of communication channels, one or more clients that use the communication channel, on the basis of the traffic patterns of the clients measured in the measuring; and
   performing control of selecting, as a communication channel with which distribution data is to be distributed to one or more of the clients, at least one of the plurality of communication channels to which the assigning has assigned the clients,
   wherein the assigning determines, for each of the plurality of communication channels, the one or more clients to be assigned to the communication channel so that a total pattern as a sum of the traffic patterns of the one or more clients to be assigned to the communication channel is within a communication-path capacity of the communication channel,
   wherein the performing control of selecting includes performing switch control in which, if a total amount at a certain time point of distribution data to be distributed to clients assigned to at least one of the plurality of communication channels exceeds the communication-path capacity of the communication channel, an excess portion of the distribution data is deleted from the communication channel, and a distribution path for the excess portion is switched to another one or more of the plurality of communication channels having an available communication-path capacity at the certain time point, and
   wherein the performing switch control further comprises selecting, as the another one or more of the plurality of communication channels having an available communication-path capacity, a communication channel whose communication-path capacity is larger than an amount of communication traffic at the certain time point indicated by a total pattern as a sum of the traffic patterns of the clients assigned to the communication channel, among the plurality of communication channels.

2. A non-transitory computer readable medium storing a program causing a computer to execute a process, the process comprising:
   measuring, for each of clients, a traffic pattern representing a pattern of temporal changes in an amount of communication traffic regarding the client;
   assigning, to each of a plurality of communication channels, one or more clients that use the communication channel, on the basis of the traffic patterns of the clients measured in the measuring; and
   performing control of selecting, as a communication channel with which distribution data is to be distributed to one or more of the clients, at least one of the plurality of communication channels to which the assigning has assigned the clients,
   wherein the assigning determines, for each of the plurality of communication channels, the one or more clients to be assigned to the communication channel so that a total pattern as a sum of the traffic patterns of the one or more clients to be assigned to the communication channel is within a communication-path capacity of the communication channel,
   wherein the performing control of selecting includes performing switch control in which, if a total amount at a certain time point of distribution data to be distributed to clients assigned to at least one of the plurality of communication channels exceeds the communication-path capacity of the communication channel, an excess portion of the distribution data is deleted from the communication channel, and a distribution path for the excess portion is switched to another one or more of the plurality of communication channels having an available communication-path capacity at the certain time point, and
   wherein the performing switch control further comprises selecting, as the another one or more of the plurality of communication channels having an available communication-path capacity, a communication channel whose communication-path capacity is larger than an amount of communication traffic at the certain time point indicated by a pattern as a sum of the traffic patterns of the clients assigned to the communication channel, among the plurality of communication channels.

3. A communication management system comprising:
a measuring unit that measures, for each of clients, a traffic pattern representing a pattern of temporal changes in an amount of communication traffic regarding the client;
an assigning unit that assigns, to each of a plurality of communication channels, one or more clients that use the communication channel, on the basis of the traffic patterns of the clients measured by the measuring unit; and
a distribution controller that performs control of selecting, as a communication channel with which distribution data is to be distributed to one or more of the clients, at least one of the plurality of communication channels to which the assigning unit has assigned the clients,
wherein for each of the plurality of communication channels, the assigning unit determines the one or more clients to be assigned to the communication channel so that a total pattern as a sum of the traffic patterns of the one or more clients to be assigned to the communication channel is within a communication-path capacity of the communication channel,
wherein the distribution controller includes a switch controller that performs switch control in which, if a total amount at a certain time point of distribution data to be distributed to clients assigned to at least one of the plurality of communication channels exceeds the communication-path capacity of the communication channel, an excess portion of the distribution data is deleted from the communication channel, and a distribution path for the excess portion is switched to another one or more of the plurality of communication channels having an available communication-path capacity at the certain time point, and
wherein the switch controller selects, as the another one or more of the plurality of communication channels having an available communication-path capacity, a communication channel whose communication-path capacity is larger than an amount of communication traffic at the certain time point indicated by a total pattern as a sum of the traffic patterns of the clients assigned to the communication channel, among the plurality of communication channels.

4. The communication management system according to claim 3, further comprising:
a schedule registering unit that accepts registration of a schedule item from each of the clients and accepts registration of distribution data to be distributed to the client in association with the schedule item registered by the client,
wherein the distribution controller regards an estimated time associated with the schedule item registered by the schedule registering unit as a specified distribution time for the distribution data registered in association with the schedule item, and performs control to distribute the distribution data at the specified distribution time.

5. The communication management system according to claim 3,
wherein the distribution controller includes a shift unit that, if a total amount at a certain time point of distribution data to be distributed to clients assigned to the communication channel exceeds the communication-path capacity of the communication channel, shifts a portion of the distribution data at the certain time point to a subsequent time point, the portion having a distribution guarantee time that is later than the certain time point, the distribution guarantee time being determined in accordance with importance of the distribution data, and
wherein, if a total amount at a certain time point of distribution data to be distributed to clients assigned to at least one of the plurality of communication channels exceeds the communication-path capacity of the communication channel even if the shift unit shifts the entire distribution data to the distribution guarantee time of the distribution data, the switch controller deletes an excess portion of the distribution data from the communication channel and switches a distribution path for the excess portion to another one or more of the plurality of communication channels having an available communication-path capacity at the certain time point.

6. A communication management system comprising:
a measuring unit that measures, for each of clients, a traffic pattern representing a pattern of temporal changes in an amount of communication traffic regarding the client;
an assigning unit that assigns to each of a plurality of communication channels one or more clients that use the communication channel, on the basis of the traffic patterns of the clients measured by the measuring unit; and
a distribution controller that performs control of selecting, as a communication channel with which distribution data is to be distributed to one or more of the clients, at least one of the plurality of communication channels to which the assigning unit has assigned the clients,
wherein for each of the plurality of communication channels, the assigning unit determines the one or more clients to be assigned to the communication channel so that a total pattern as a sum of the traffic patterns of the one or more clients to be assigned to the communication channel is within a communication-path capacity of the communication channel,
wherein the distribution controller includes a switch controller that performs switch control in which, if a total amount at a certain time point of distribution data to be distributed to clients assigned to at least one of the plurality of communication channels exceeds the communication-path capacity of the communication channel, an excess portion of the distribution data is deleted from the communication channel, and a distribution path for the excess portion is switched to another one or more of the plurality of communication channels having an available communication-path capacity at the certain time point, and
wherein the distribution controller includes a shift unit that, if a total amount at a certain time point of distribution data to be distributed to clients assigned to the communication channel exceeds the communication-path capacity of the communication channel, shifts a portion of the distribution data at the certain time point to a subsequent time point, the portion having a distribution guarantee time that is later than the certain time point, the distribution guarantee time being determined in accordance with importance of the distribution data, and
wherein, if a total amount at a certain time point of distribution data to be distributed to clients assigned to at least one of the plurality of communication channels exceeds the communication-path capacity of the communication channel even if the shift unit shifts the entire distribution data to the distribution guarantee time of the distribution data, the switch controller deletes an excess portion of the distribution data from the communication channel and switches a distribution path for the excess portion to another one or more of the plurality of communication channels having an available communication-path capacity at the certain time point.

7. A communication management system comprising:
a measuring unit that measures, for each of clients, a traffic pattern representing a pattern of temporal changes in an amount of communication traffic regarding the client;
an assigning unit that assigns, to each of a plurality of communication channels, one or more clients that use the communication channel, on the basis of the traffic patterns of the clients measured by the measuring unit;
a distribution controller that performs control of selecting, as a communication channel with which distribution data is to be distributed to one or more of the clients, at least one of the plurality of communication channels to which the assigning unit has assigned the clients; and
a schedule registering unit that accepts registration of a schedule item from each of the clients and accepts registration of distribution data to be distributed to the client in association with the schedule item registered by the client,
wherein for each of the plurality of communication channels, the assigning unit determines the one or more clients to be assigned to the communication channel so that a total pattern as a sum of the traffic patterns of the one or more clients to be assigned to the communication channel is within a communication-path capacity of the communication channel,
wherein the distribution controller regards an estimated time associated with the schedule item registered by the schedule registering unit as a specified distribution time for the distribution data registered in association with the schedule item, and performs control to distribute the distribution data at the specified distribution time, and further comprising:
a distribution guarantee time obtaining unit that obtains a distribution guarantee time which is calculated by adding the specified distribution time for the distribution data registered in association with the schedule item and an allowable delay time which is determined in accordance with importance of the distribution data,
wherein, if a total amount at a certain time point of distribution data to be distributed to the clients assigned to the communication channel exceeds the communication-path capacity of the communication channel, the distribution controller shifts a portion of the distribution data at the certain time point to a subsequent time point, the portion having a distribution guarantee time that is later than the certain time point.

8. A communication management system comprising:
a measuring unit that measures, for each of clients, a traffic pattern representing a pattern of temporal changes in an amount of communication traffic regarding the client;
an assigning unit that assigns, to each of a plurality of communication channels, one or more clients that use the communication channel, on the basis of the traffic patterns of the clients measured by the measuring unit; and
a distribution controller that performs control of selecting, as a communication channel with which distribution data is to be distributed to one or more of the clients, at least one of the plurality of communication channels to which the assigning unit has assigned the clients,
wherein for each of the plurality of communication channels, the assigning unit determines the one or more clients to be assigned to the communication channel so that a total pattern as a sum of the traffic patterns of the one or more clients to be assigned to the communication channel is within a communication-path capacity of the communication channel,
wherein the assigning unit includes
a feature vector obtaining unit that obtains feature vectors representing features of pattern forms of the traffic patterns of the clients,
a clustering unit that groups the clients into a plurality of clusters in accordance with similarity among the feature vectors,
a cluster range information memory that stores, for each cluster generated through clustering performed by the clustering unit, a range of feature vectors belonging to the cluster, and
a combination information memory that stores, for each of the plurality of communication channels, a combination of clients in which a total pattern as a sum of the traffic patterns of one or more clients assigned to the communication channel is within a communication-path capacity of the communication channel, the combination being expressed by a combination of clusters to which the clients belong, and the combination being stored as a combination of clusters assignable to the communication channel, and
wherein the assigning unit obtains clusters to which the feature vectors of the traffic patterns of the clients belong from information stored in the cluster range information memory, and obtains, in accordance with the obtained clusters corresponding to the clients, a combination of clients to be assigned to the communication channel from among combinations of clients that satisfy a combination of clusters assignable to the communication channel stored in the combination information memory.

9. A communication management system comprising:
a measuring unit that measures, for each of clients, a traffic pattern representing a pattern of temporal changes in an amount of communication traffic regarding the client;
an assigning unit that assigns, to each of a plurality of communication channels, one or more clients that use the communication channel, on the basis of the traffic patterns of the clients measured by the measuring unit;
a distribution controller that performs control of selecting, as a communication channel with which distribution data is to be distributed to one or more of the clients, at least one of the plurality of communication channels to which the assigning unit has assigned the clients; and
a capacity pattern measuring unit that measures a pattern of temporal changes in an effective communication-path capacity of a best-effort-type communication channel among the plurality of communication channels,
wherein for each of the plurality of communication channels, the assigning unit determines the one or more clients to be assigned to the communication channel so that a total pattern as a sum of the traffic patterns of the one or more clients to be assigned to the communication channel is within a communication-path capacity of the communication channel, and
wherein the assigning unit determines one or more clients to be assigned to the best-effort-type communication channel so that a total pattern as a sum of the traffic patterns of one or more clients assigned to the best-effort-type communication channel is within the pattern measured by the capacity pattern measuring unit.

* * * * *